United States Patent [19]
Fukushima et al.

[11] Patent Number: 5,587,778
[45] Date of Patent: Dec. 24, 1996

[54] OVERLAID IMAGE FORMING APPARATUS

[75] Inventors: Hisashi Fukushima; Tatsuo Takeuchi; Harumi Sakoh, all of Kawasaki; Nobuatsu Sasanuma, Yamato, all of Japan

[73] Assignee: Canon Kabushiki Kaisha, Tokyo, Japan

[21] Appl. No.: 353,343

[22] Filed: Dec. 2, 1994

Related U.S. Application Data

[63] Continuation of Ser. No. 8,551, Jan. 22, 1993, abandoned.

[30] Foreign Application Priority Data

Jan. 23, 1992 [JP] Japan ................... 4-009821

[51] Int. Cl.⁶ .................................... G03G 21/00
[52] U.S. Cl. ..................... 355/246; 355/208; 355/219
[58] Field of Search .................... 355/246, 326 R, 355/327, 210, 214, 219, 225, 203, 204, 208, 328; 346/108

[56] References Cited

U.S. PATENT DOCUMENTS

| | | | |
|---|---|---|---|
| 4,326,796 | 4/1982 | Champion et al. | 355/219 X |
| 4,502,777 | 3/1985 | Okamoto et al. | 355/208 |
| 4,512,652 | 4/1985 | Buck et al. | 355/219 |
| 4,736,223 | 4/1988 | Suzuki | 355/214 |
| 4,809,037 | 2/1989 | Sato | 355/327 X |
| 4,890,138 | 12/1989 | Miyamoto et al. | 355/246 |
| 4,920,380 | 4/1990 | Ueda et al. | 355/219 |
| 4,935,777 | 6/1990 | Noguchi et al. | 355/210 |
| 5,072,258 | 12/1991 | Harada | 355/208 |
| 5,153,609 | 10/1992 | Ando et al. | 355/208 X |
| 5,164,776 | 11/1992 | Oresick et al. | 355/208 |

FOREIGN PATENT DOCUMENTS

| | | |
|---|---|---|
| 0163791 | 12/1985 | European Pat. Off. .......... 355/326 R |
| 62-283356 | 12/1987 | Japan . |
| 62-284578 | 12/1987 | Japan . |
| 0161257 | 1/1990 | Japan . |
| 0245464 | 3/1990 | Japan . |

*Primary Examiner*—Matthew S. Smith
*Attorney, Agent, or Firm*—Fitzpatrick, Cella, Harper & Scinto

[57] ABSTRACT

An image forming apparatus for forming an over laid image on a transfer material includes an electrophotographic photosensitive member movable along an endless path, a latent image forming device for forming an electrostatic latent image on the photosensitive member, a developing device for developing the electrostatic latent image with toner, and a transfer device for transferring the toner image onto the transfer material. The latent image forming device includes a controller for changing a latent image forming condition so as to reduce a potential difference between a latent image potential formed in a first rotation of the photosensitive drum at the start of image forming operation and a latent image potential in a subsequent rotation, and a latent image to be developed is formed from the first rotation without pre-rotation effected until the charge potential of the photosensitive member is stabilized.

16 Claims, 12 Drawing Sheets

OVERLAID IMAGE FORMING APPARATUS

This application is a continuation of application Ser. No. 08/008,551, filed Jan. 22, 1993, now abandoned.

FIELD OF THE INVENTION AND RELATED ART

The invention relates to an image forming apparatus, and more particularly, to a multiplex image forming apparatus of an electrophotographic type.

Heretofore, among the image forming apparatuses, a laser printer which carries out image exposure by laser in a photosensitive member, develops it, and provides an image, is well known. The laser printer has the advantage that the print quality is high and printing speed is high. They are known widely as output apparatuses for personal computers, or word-processors or the like.

Figure 9:
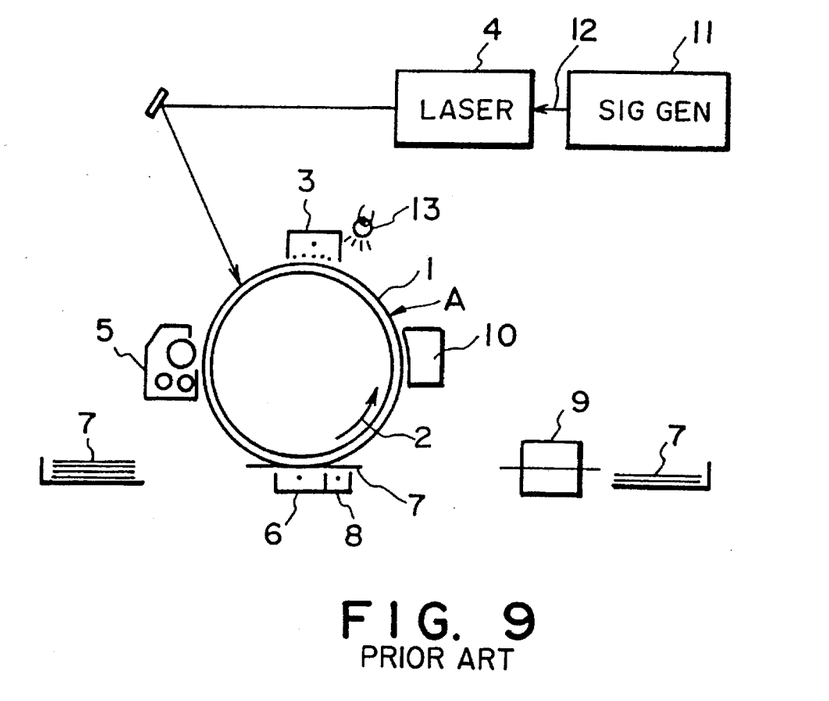
FIG. 9 is an illustration of the image forming mean of an exemplary conventional laser beam printer.

FIG. 9 is an illustration of an image forming means of an exemplary conventional laser printer. A photosensitive member 1 starts rotation in the direction of an arrow 2 in FIG. 9 at the time of the print start. Simultaneously, a pre-exposure lamp 13 is lighted, so that the residual charge on photosensitive-member 1 is removed, and the photosensitive member is uniformly charged by a charger 3. The operation is continued during one rotation of the photosensitive member i (which will hereinafter be called "pre-rotation").

The pre-rotation prevents charging nature and sensitivity of the photosensitive member 1 from being non-constant due to the history of the photosensitive member 1 before the print start. After that, the projection of the pre-exposure light 13 and the uniform charging by the charger are carried out. The laser beam is projected from semiconductor laser 4 driven in accordance with the image data 12 outputted by the signal generator 11, to the image forming portion of the photosensitive-member surface. In the image exposure, the beam is not projected onto the non-image-forming portion, and an electrostatic latent image is formed on the photosensitive member.

The latent image is developed by a developing device 5, so that a toner image is formed on the photosensitive member 1. The image is transferred onto a transfer sheet 7 by a transfer charger 6, and is electrostatically separated therefrom by a separation charger 8. Thereafter, it is fixed and discharged by an image fixing device 9. The non-transferred toner which remains on the photosensitive member 1 is removed by a cleaner 10.

Figure 10A:
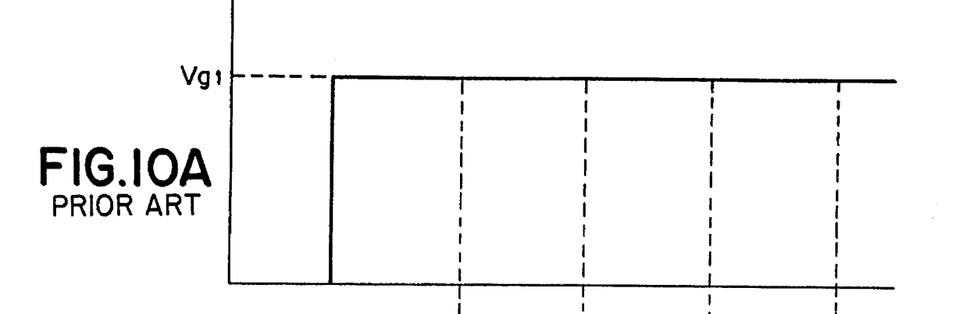
FIGS. 10A–10C show a graph illustrating the surface. potential immediately after the electrification in an exemplary conventional latent-image formation which is.
Figure 10B:
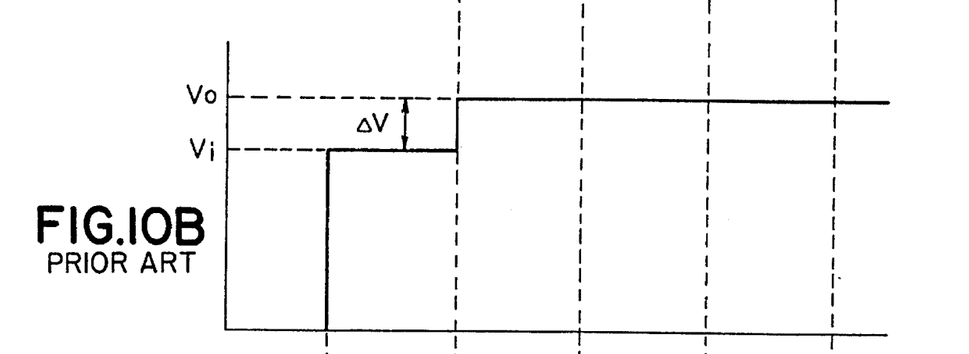
Figure 10C:
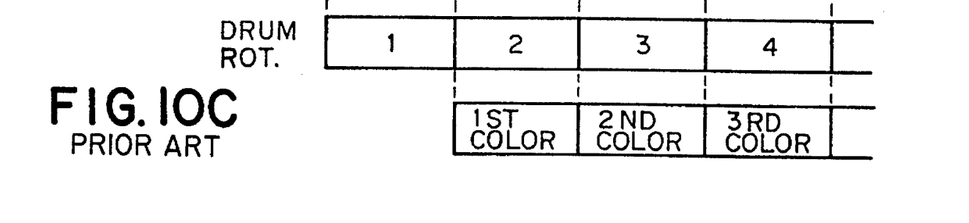

FIGS. 10A–10C show a surface potential immediately after the charging in an exemplary conventional latent image forming operation.

In these figures, with the conventional latent-image forming operation, one idling rotation of the drum is effected while keeping a grid bias voltage constant at Vg1 (FIG. 10(a)). The surface potential of point A on the drum in the first rotation is Vi (FIG. 10(b)). There is a potential difference of ΔV between the potential Vi and the potential V0 of the same point A on the drum in the second and subsequent rotations.

The potential difference ΔV changes depending upon drum characteristic or construction of the charging system or the like. Thus, in the conventional example, after rotating the drum through one or more turns and eliminating a charging history, an image formation is carried out in drum rotation thereafter (FIG. 10(c)).

Therefore, the wasteful period for the idling rotation is required. As described above, in the conventional example, the pre-rotation is performed after the print start instructions.

There was a problem that the period which the first print takes was therefore long. Particularly in the case of the color printer which uses two or more developing devices, the diameter of the photosensitive member needs to be increased and, in this case, the pre-rotation period is long in proportion to the circumferential length of the photosensitive member. Therefore, lost time is incurred.

On the other hand, particularly in a printer which carries out the faithful reproduction of the half tone image using a two component developer, if the stabilization of charging nature and of the sensitivity by pre-rotation is omitted, image characteristic of the hall tone image is unstable, and the resultant image is damaged.

SUMMARY OF THE INVENTION

The present invention has a principal object to provide an image forming apparatus having a photosensitive drum of a particularly large diameter by which the first print period is short.

The present invention has another object to provide an image forming apparatus in which the period required by the drum surface potential measurement is short, and in which a photosensitive member requiring the potential stabilizing operation such as an organic photoconductor is used.

According to an aspect of the present invention, there is provided an image forming apparatus for forming an over laid image on a transfer material, comprising: an electrophotographic photosensitive member movable along an endless latent image forming means for forming an electrostatic latent image on said photosensitive member; developing means for developing the electrostatic latent image with toner; and transfer means for transferring the toner image onto the transfer material. The latent image forming means comprises control means for changing a latent image forming condition so as to reduce a potential difference between a latent image potential formed in a first rotation of said photosensitive drum at the start of an image forming operation and a latent image potential in a subsequent rotation, and a latent image to be developed is formed from the first rotation without pre-rotation effected until the charge potential of the photosensitive member is stabilized.

These and other objects, features and advantages of the present invention will become more apparent upon consideration of the following description of the preferred embodiments of the present invention taken in conjunction with the accompanying drawings.

DESCRIPTION OF THE PREFERRED EMBODIMENTS

Referring to the accompanying drawings, the embodiment of the present invention will be described.

Figure 1:
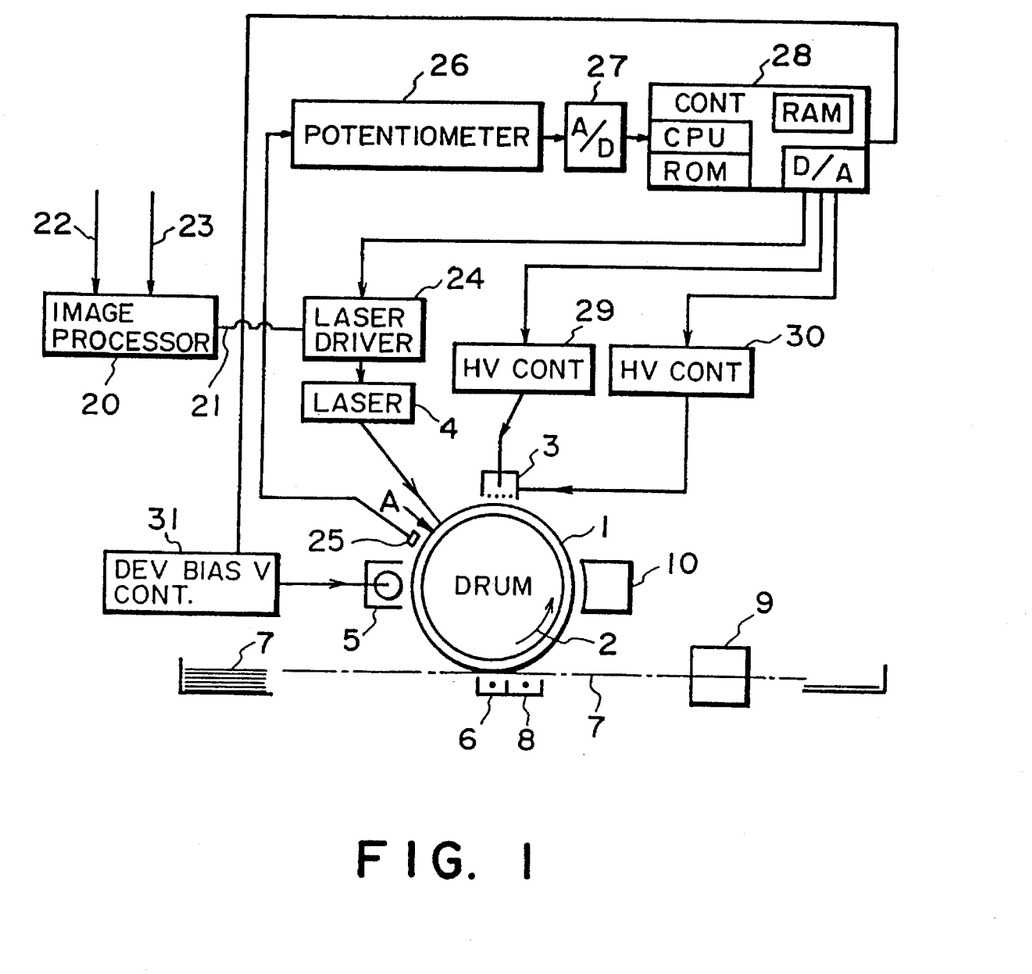
FIG. 1 is an illustration of a laser beam printer of an embodiment of the invention.

FIG. 1 is an illustration of a laser beam printer of an embodiment of the present invention. In the figure, the same reference numerals as the above-mentioned conventional example designate the same or corresponding portions, and the duplication of description is omitted.

In FIG. 1, reference numeral 20 designates an image processor. This receives the image data 22 and standard clock signals 23, and outputs the binary image data 21 modulated in the pulse width almost continuously in accordance with the image density. The binary image datum 21 is inputted into a laser driver 24, and it drives a laser 4, which is outputted as a modulated laser beam.

As described in FIG. 9 of the conventional example, the laser beam from the laser 4 scans a photosensitive member 1 surface, and provides a two dimensional electrostatic latent image with rotation in the direction of an arrow 2 of the photosensitive member 1 charged uniformly. The electrostatic latent image is developed by a developing device 5, and is transferred onto a transfer sheet 7. The toner which remains without being transferred is removed by a cleaner 10. After the transfer, the transfer sheet 7 is separated from the photosensitive drum 1 by a separation charger 8, and is discharged through an image fixing device 9.

Reference numeral 25 designates a potential sensor, and it is disposed adjacent to the surface of the photosensitive member 1 in the position after the laser beam projection to the photosensitive member 1, and effects potential detection of the electrostatic latent image of the surface of the photosensitive member 1. An output of the potential sensor 25 is inputted into a potential measurement means 26. Since the measured potential is an analog value, it is converted into a digital signal by an analog digital converter 27, and is supplied to the control means.

A controller 28 is in the form of a cpu such as a micro computer. It has a ROM which stores a control program and data or the like for the cpu, a RAM functioning as the work area of the cpu, various I/O ports, a D/A converter, and it controls the whole apparatus. The controller outputs the instruct on signal to various controllers, which will be described hereinafter, in the form of an analog signal.

Reference numeral 29 indicates a high-voltage controller which controls charging current of the charger 3, and reference numeral 30 designates the high-voltage controller for the grid bias for controlling grid bias voltage of the charger 3. Reference numeral 24 designates a laser driver which controls intensity of the laser beam, and it drives the laser 4, and reference numeral 31 designates a development bias voltage controller which controls the development bias of the developing device 5.

Figure 2:
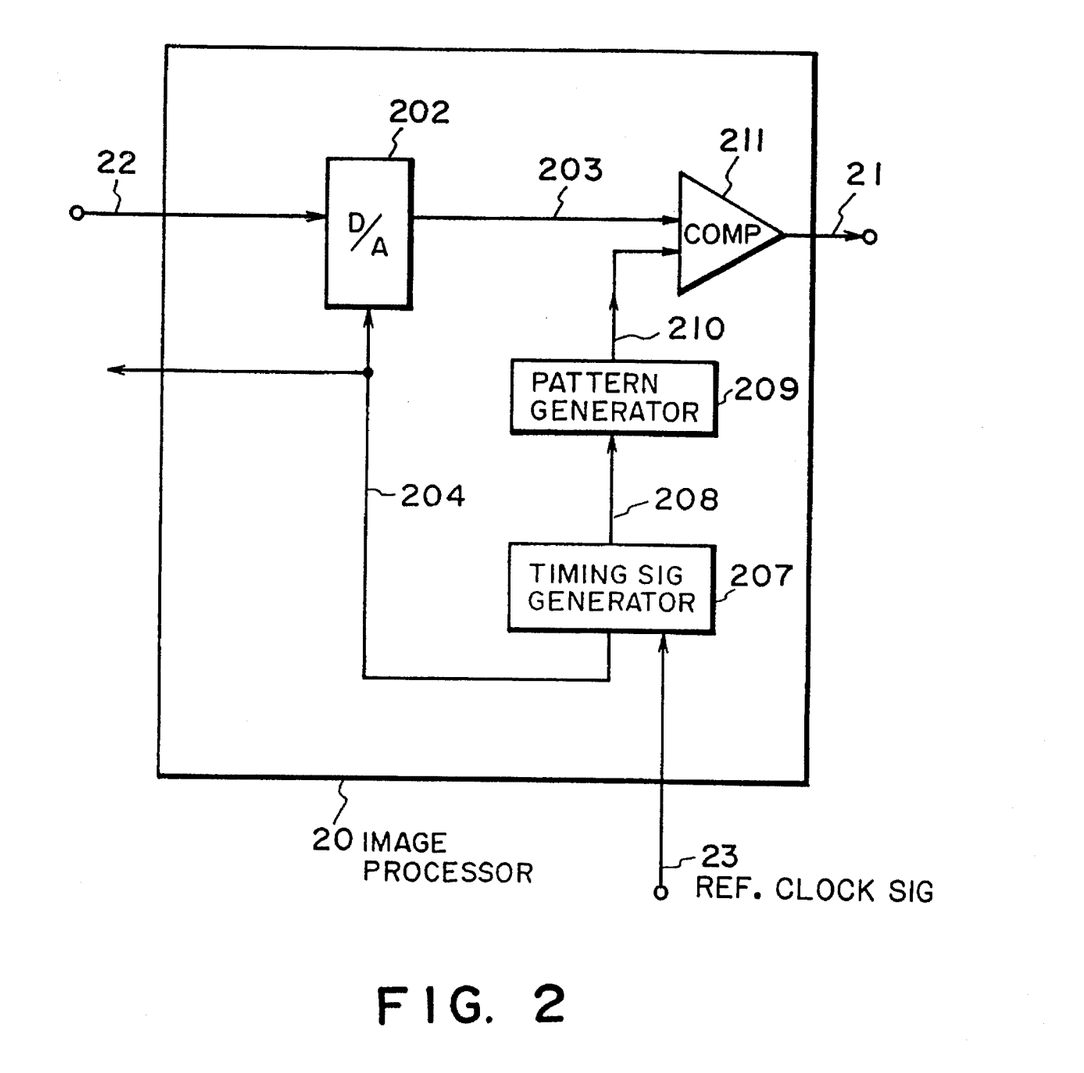
FIG. 2 is an illustration of an image processor.

The image processor (FIG. 1) of the embodiment will be described using FIGS. 1 and 2. FIG. 2 is a block diagram of the image processor 20 of FIG. 1, and the same portions as FIG. 1 are designated with the same reference numerals. In FIG. 2, digital image data 22 are converted into analog image signals 203 by a digital analog converter 202, and are fed to one contact of a comparator 211.

Designated by reference numeral 207 is a timing signal generating circuit, and it receive a reference clock signal 23, and generates and outputs a pixel clock signal 204 and the screen clock signal 208 to a pattern signal generator 209. A pattern signal generator 209 outputs the pattern signal 210 on the basis of the screen clock signal 208, and feeds it to the contact of another side of the comparator 211.

The digital image datum 21 is fed in synchronism with the pixel clock signal 204, and the digital analog converter 202 outputs the analog image signal 203 in synchronism with the pixel clock signal 204. The screen clock 208 signal has a period which is an integer multiple of the pixel clock signal 204, and defines the period of a pattern signal 210 in the form of a triangle wave, for example.

The analog image signal 203 and the pattern signal 210 are compared by the comparator 211. When the analog image signal 203 is larger, 0 is outputted. When it is smaller, 1 is outputted. This way, the pulse-width-modulated binary image datum 21 is outputted.

Figure 3:
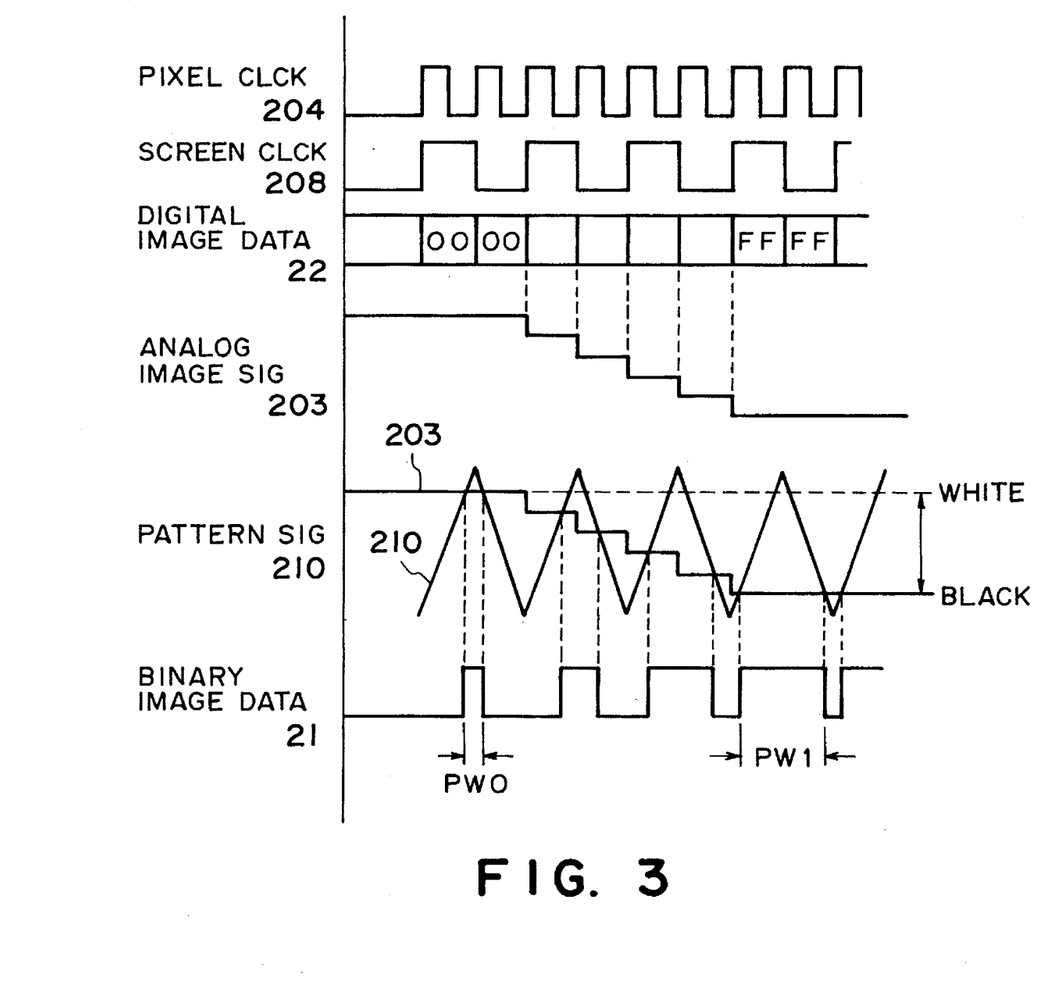
FIG. 3 is a timing chart illustrating the timing of each part of FIG. 2.

FIG. 3 is a timing chart showing the timing of each part of FIG. 2. In the embodiment, the screen clock signal 208 has the period which is twice that of the pixel clock signal 204. When digital image signal 22 changes from 00 (white) to FF (hexadecimal), pulse wave form of the binary image data 21 modulated in the pulse width by pattern signal 210, is shown in the Figure. Thus, the relationship between the input level of the digital image signal 22 and the pulse width of the binary image datum 21, is changeable by changing amplitude of the pattern signal 210.

Figure 4:
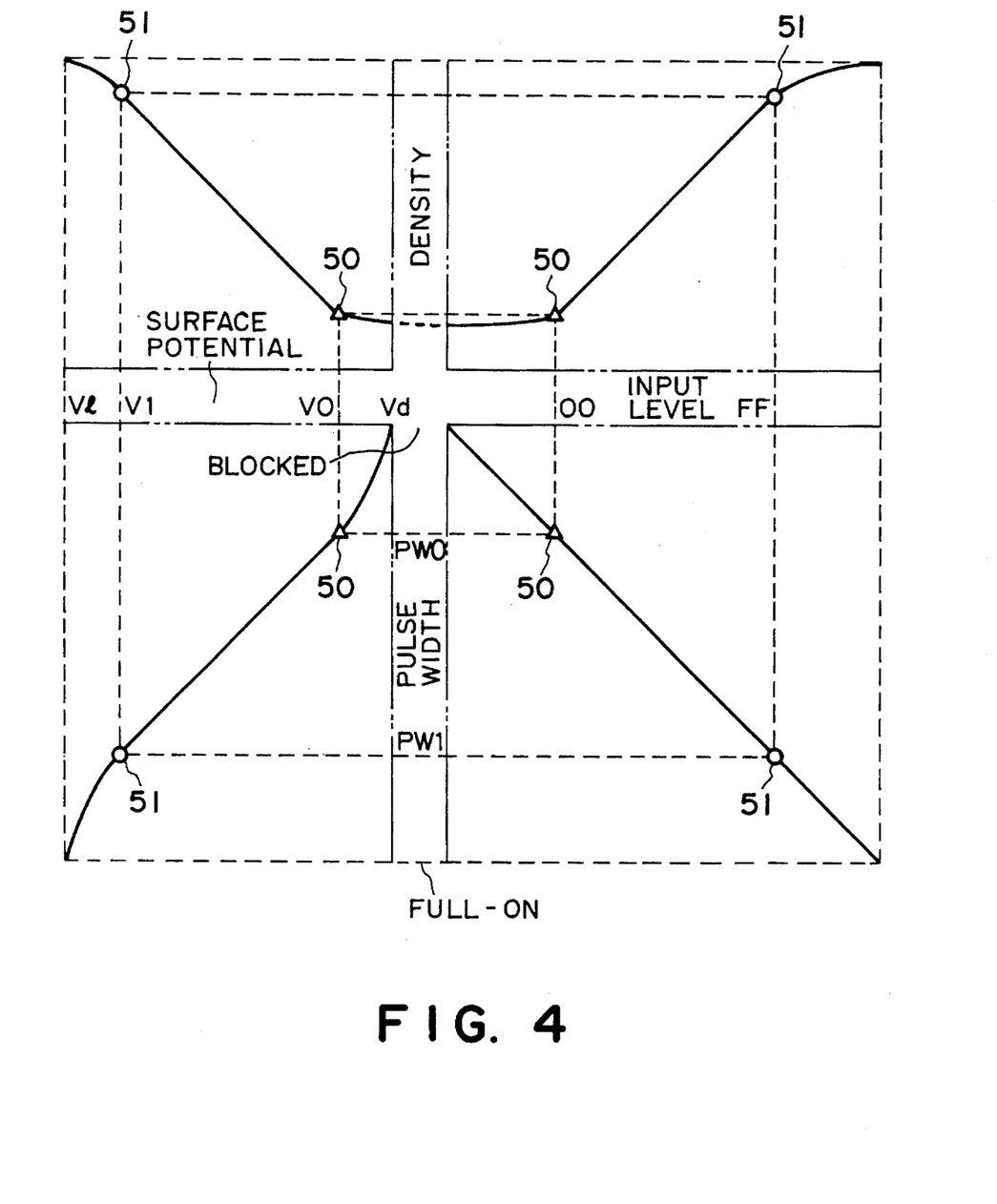
FIG. 4 is a sensitometry of the conversion to a surface potential from an exposure, and conversion to a image density from surface potential.

The sensitometry will be described referring to FIG. 4. FIG. 4 is the sensitometry showing the conversion to surface potential from exposure, and conversion to the density from surface potential.

When feeding the 8-bit digital image signal 22 (256 data to FF from 00) in FIG. 4, the almost continuous pulse width modulation by the image processor 20 is effected. The binary image datum 21 is fed to the image forming means of laser beam printer. The conversion to surface potential from the exposure by the laser beam and conversion to the density from surface potential are effected. The correspondence in the case is shown.

Since the image processor 20 has an object of providing the image output having higher tone reproduction, it is desirable that the relationship of the density of the input level of the binary image datum 21 and the reproduction image, is linear. The linear portion, however, as will be understood in FIG. 4 is a portion from a triangle mark (50) to a circle mark (51). Therefore, good tone reproduction is provided from the 8-bit digital image by selecting FF as the input level of portion 51 by selecting 00 as the input level of portion 50.

The pulse width of the binary image datum 21 is made to correspond to the input level. As shown in FIG. 3, the pulse width for the white level (00) is set as PW0, and the pulse width for the black level (FF) is set as PW1.

On the other hand, as to surface potential measured by the potential sensor 24 of the photosensitive member 1, the potential corresponding to the white level is set as V0, and the potential corresponding to the black level is set as V1.

In many cases, the potential V0 and V1 are different from dark portion potential (Vt) (non-exposed portion) and the light portion potential (V1) (exposed portion). However, the region used for the image formation is in the region between the triangle mark (50) and the circular mark (51). As described in conjunction with the conventional example of FIG. 10, one idle rotation is carried out while keeping the grid bias voltage constant (Vg1). The surface potential in the first rotation at a point A is Vi, which is different from the potential V0 of the same point in the second and subsequent rotations, the potential difference being $\Delta V$ (FIG. 10). The potential different $\Delta V$ changes depending on the characteristics of the drum or the structure of the charging system. Thus, in the conventional example, only after rotating the drum through one or more full turns to remove the charging hysteresis, the image forming operation is carried out in the subsequent drum rotations. Therefore, wasted time is required by the idle rotation. In this embodiment, the sequential operations are as shown in FIGS. 5A–5C, and in order to correct the potential difference between the first and second rotations ($\Delta V$ in FIG. 10), the latent image forming condition subsequent to the second rotation is controlled.

Figure 5A:
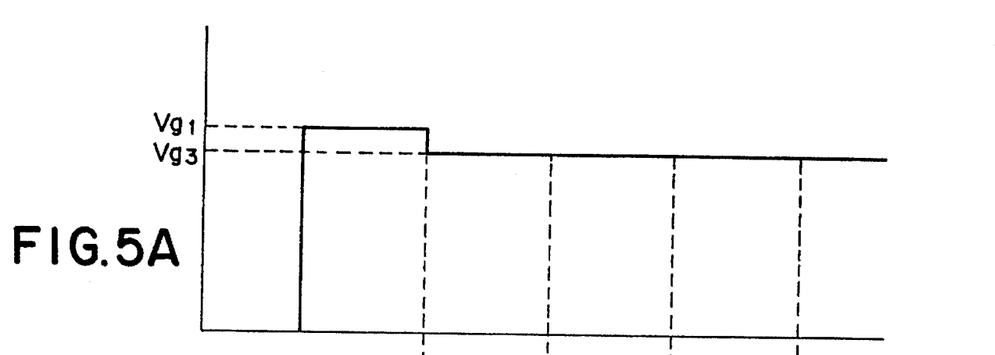
FIGS. 5A–5C show a drum surface potential and the rotational sequence of the embodiment.
Figure 5B:
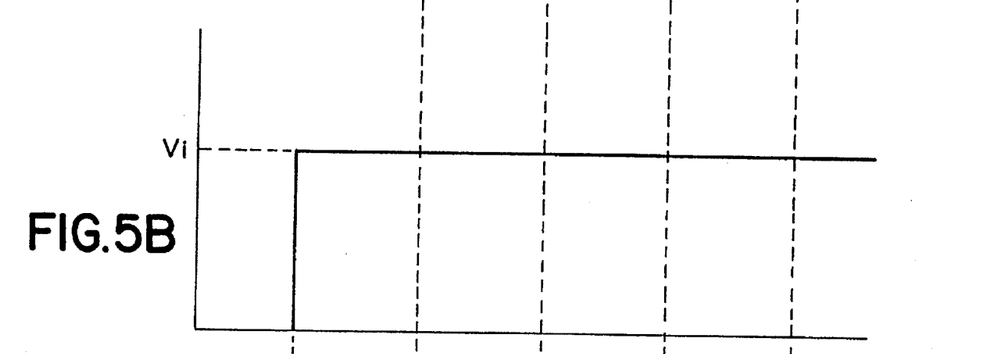
Figure 5C:
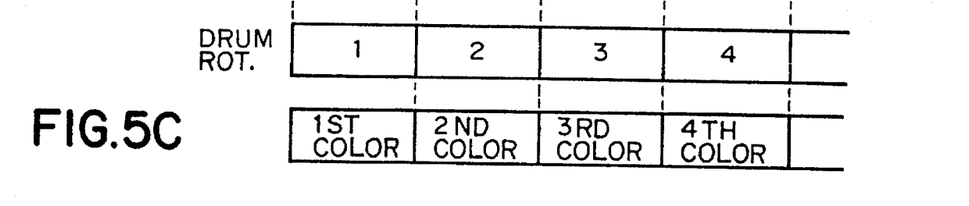

More particularly, as shown in FIG. 5B, in order to keep the potential Vi constant, the grid bias voltage in the second rotation and in the subsequent rotations, is set to Vg3 which is lower than the grid bias Vg1 for the first rotation, as shown in FIG. 5A.

Or, in order to correct the potential difference $\Delta V$, thus providing constant potential Vi in the first, second and subsequent rotations, the grid bias voltage for the first rotation is set to Vg2 (not shown) which is higher than the grid bias voltage Vg1 in the second and subsequent rotations.

As for the operational sequence of this embodiment, the potential difference $\Delta V$ (FIG. 10B) between the first rotation and the second rotation with the constant grid bias voltage during the pre-rotation, at the predetermined timing in accordance with the drum characteristics or during a post-rotation. In order to make the potentials of the first and second rotations equal to each other, that is, in order to remove the potential difference $\Delta V$, the grid bias is controlled in accordance with the sequence shown with the flow chart in FIG. 7.

Figure 11:
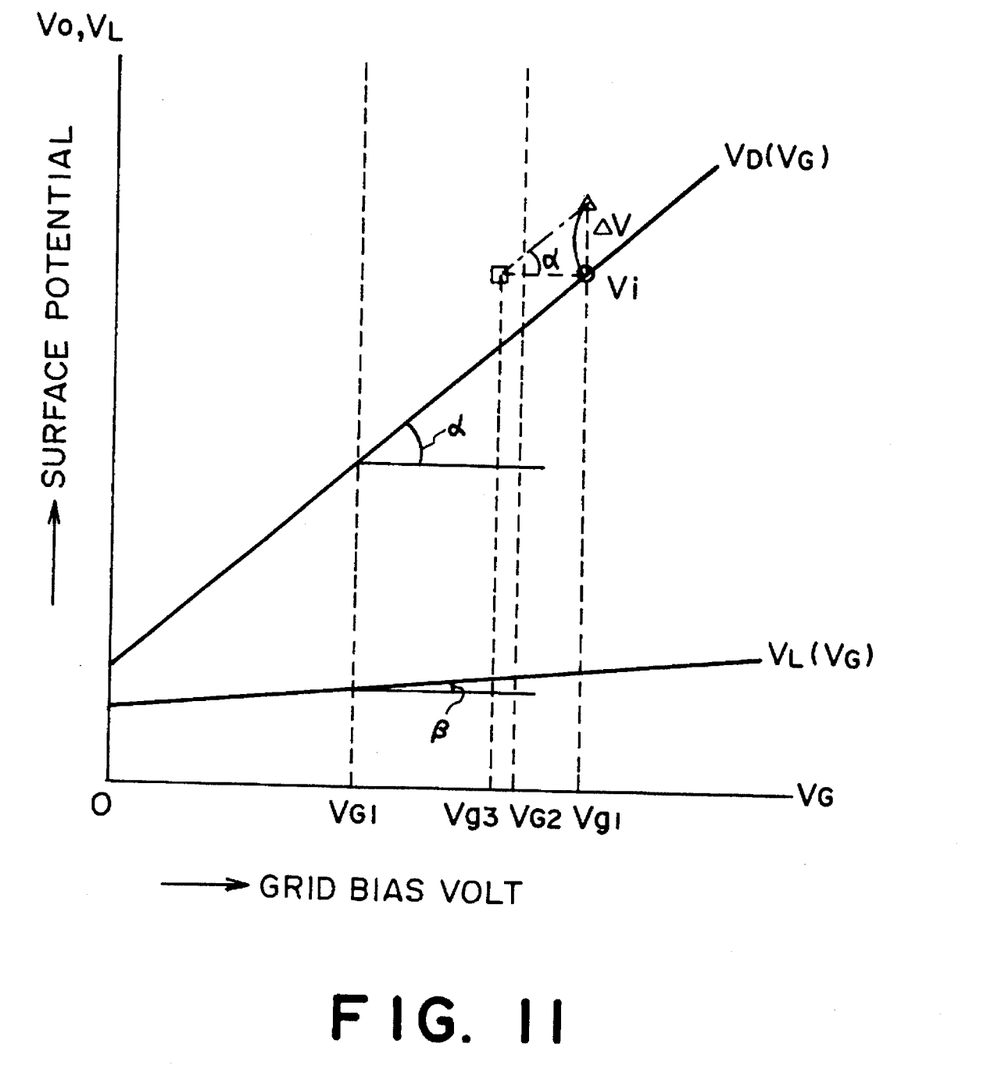
FIG. 11 is a graph of a grid bias voltage opposite vs. surface potential.
Figure 12A:
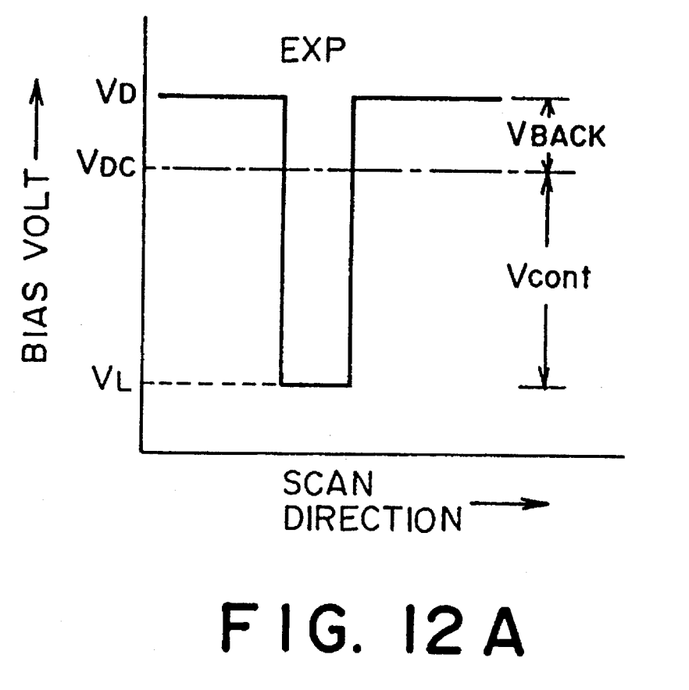
FIGS. 12A and 12B illustrate the definitions of vcont, Vback, VDC.
Figure 12B:
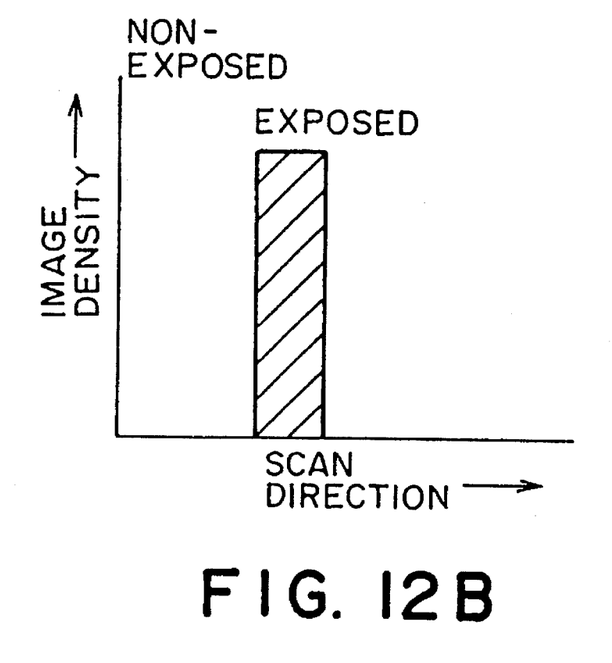

FIGS. 11, 12A and 12B are disclosed in Japanese Laid-Open Patent Application No. 283,356/1987, and FIG. 11 shows a relation between the grid bias voltage and the surface potential, and FIGS. 12A and 12B show definitions of Vcont, Vback, and VDC. From FIG. 11, it can be seen that "$\alpha$" represents the inclination of the dark potential $V_D$ and "$\beta$" represents the inclination of a light potential $V_L$. These inclinations are calculated in step 4 of the flow chart shown in FIG. 7, and are based on the values detected in steps 2 and 3 of the flow chart. As evident in FIG. 12A, Vback equals the difference between $V_D$ and $V_{DC}$ (developing bias voltage) and Vcont equals the difference between $V_{DC}$ and $V_L$. When, for example, the main switch is actuated, the potential measurement operation is carried out without the pre-rotation, and the data required for the potential control are taken in. The grid bias voltage Vg and the developing bias voltage Vdg are calculated so as to satisfy the predetermined level Vcont and Vback for the first rotation. When the control data for the second rotation are to be obtained, the above-described $\Delta V$ is taken account together with the Vcont and Vback as input values.

In the foregoing embodiment, the potentials of the same point of the drum are compared and the potential difference between the first rotation and the second rotation is measured. However, this invention is not limited to this example. In an alternative, the potential measurements are carried out for a plurality of points, and the data are averaged, and then the differences determined. This alternative is better in that the representative value of the drum characteristics can be detected without being influenced by the charging performance non-uniformity for the drum.

Figure 6:
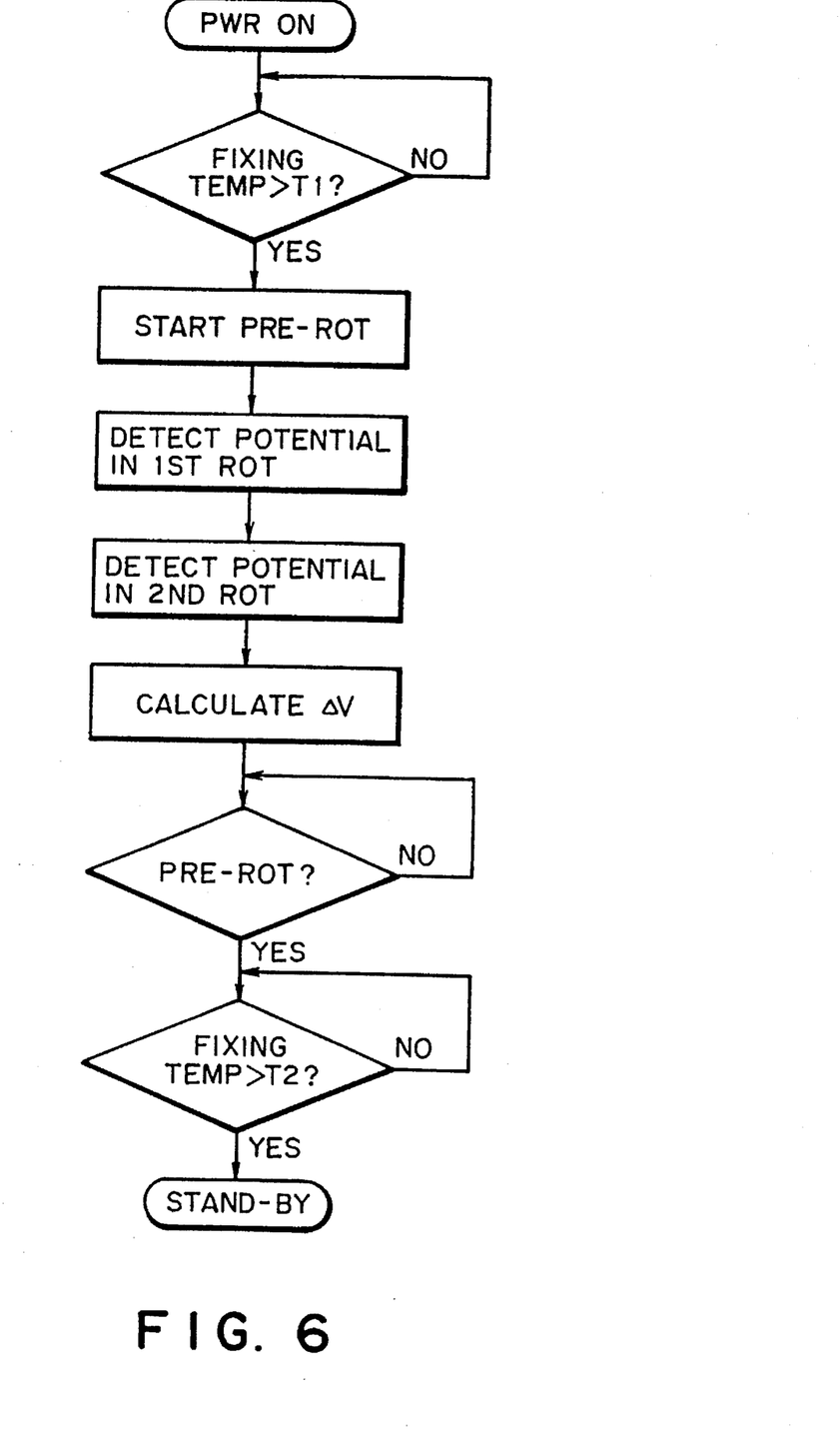
FIG. 6 is a flow chart showing the sequence for measuring potential difference ΔV between the first rotation and the second rotation in the pre-rotation.

FIG. 6 shows an example of a operational sequence for measuring the potential difference $\Delta V$ in the pre-rotation. In this embodiment, the dark potential and the light potential are measured. The present invention is not limited to this. As an example, it is an alternative that the potentials corresponding to the minimum level and the maximum level of the image information, can be measured (Japanese Laid-Open Patent Application No. 284578/1987). As for the method of controlling the grid bias voltage to remove the potential difference $\Delta V$, the grid bias voltage is set to Vg1, as shown in FIG. 11, for example. When the potential in the first rotation is Vi, and the potential in the second rotation is Vi+$\Delta V$, the grid bias voltage for the second rotation is determined so as to satisfy:

$$\alpha = \Delta V/(Vg1 - Vg3)$$

The grid bias voltage Vg3 is applied, by which the potential in the second rotation is Vi. In the foregoing, the potential difference $\Delta V$ between the first rotation and the second rotation is shown. However, the present invention is not limited to this. If the image forming apparatus has the same structure, the potential difference $\Delta V$ hardly changes, in some cases. In this case, the potential difference $\Delta V$ can be stored as a fixed value.

As a further alternative, a parameter (rest period, for example) having an interrelation with the potential difference $\Delta V$ is measured, and the potential difference $\Delta V$ is predicted in accordance with a predetermined table.

Figure 7:
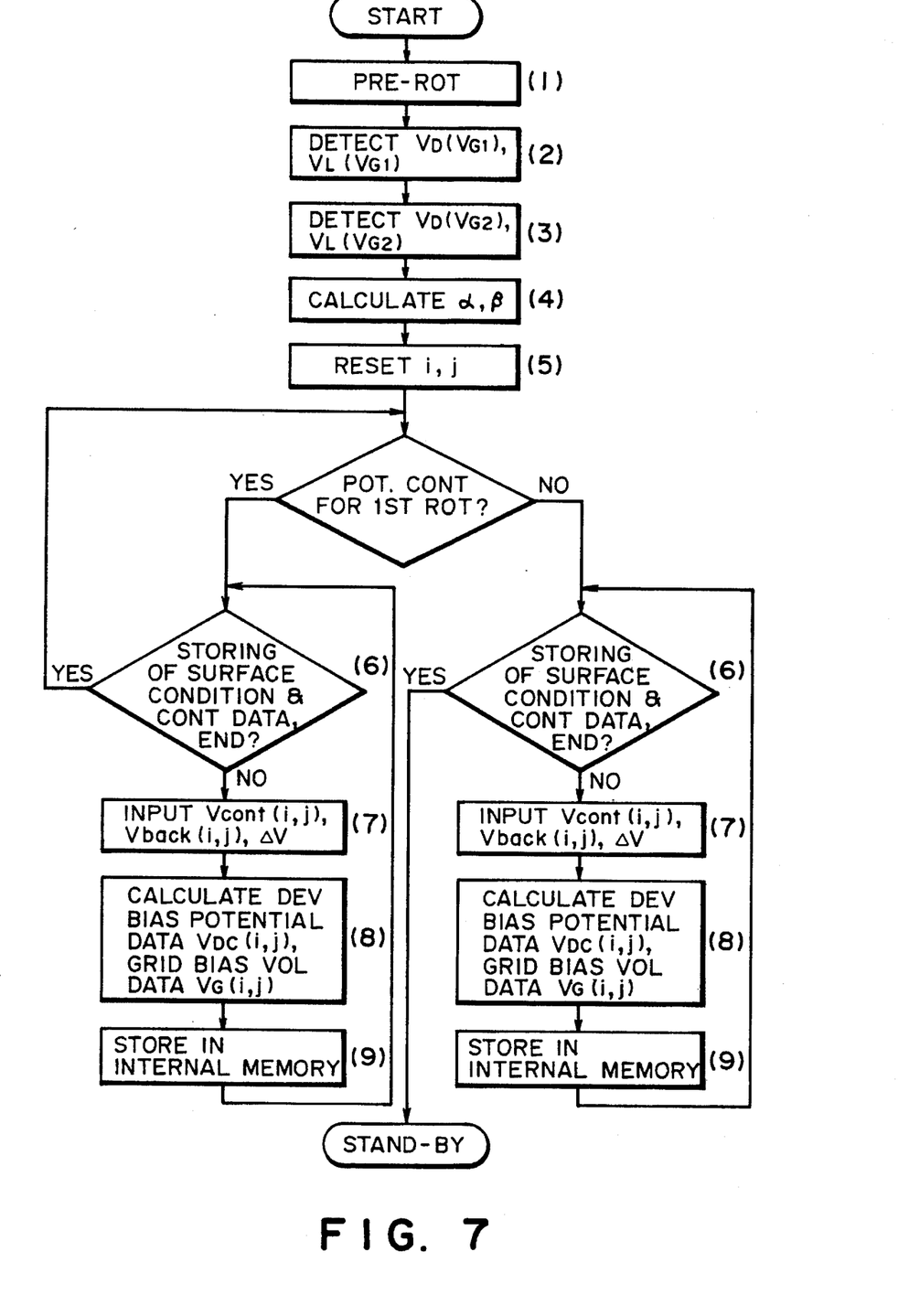
FIG. 7 is a flow chart showing control of a grid bias for eliminating the potential difference ΔV.
Figure 8:
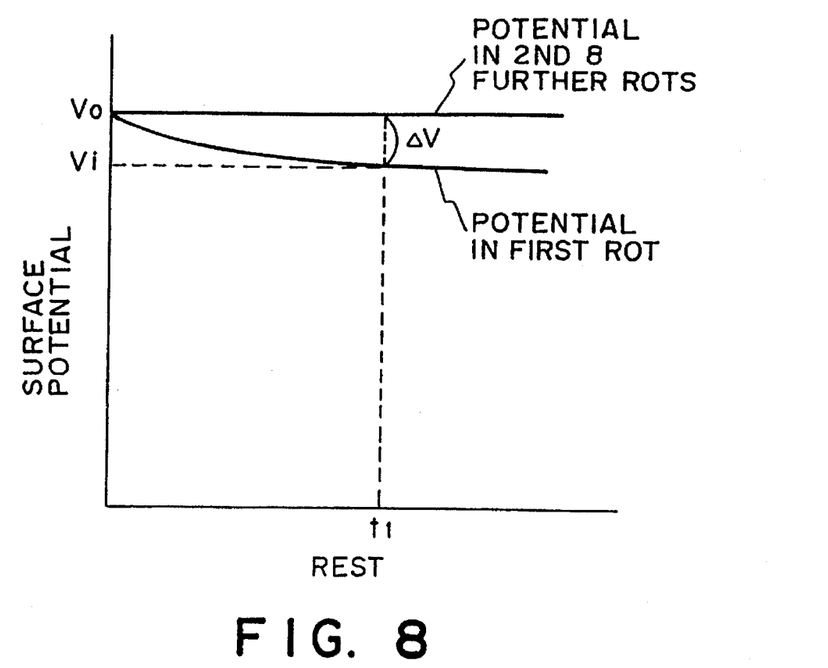
FIG. 8 is a graph showing relation surface potential of the first rotation and second-rotation, and the sheet feed period.

As for the operational sequence, it has been predetermined that there is a relation schematically shown in FIG. 7 between the rest period and the surface potential of the first rotation and the surface potential of the second rotation. The relation is stored in a memory. As shown in FIG. 6, the rest (t1 in FIG. 8) when the copy start signal is supplied, is measured. Referring to the stored data, the potential difference $\Delta V$ in accordance with the rest period t1 is predicted.

In the foregoing embodiment, the latent image forming condition to be controlled is a grid bias voltage. The present invention is not limited to this. For example, in an alternative structure, the electric current for the primary charging is measured. In this case, the relationship between the current and the surface potential are determined beforehand.

In the foregoing embodiments, the process factor to be measured is a surface potential, but it is a possible alternative that there is provided an image density measuring means for measuring the image density after the image is visualized by the developing means, and in accordance with the outcome of the measurement, the latent image forming condition is controlled.

In the foregoing embodiment, the potentials of the first and second rotations are made equal to each other (V0). However, the present invention is not limited to this.

It is effective particularly in full-color image forming apparatus that the target values of the drum surface potentials are made different among the first rotation, the second rotation and the subsequent rotations, for example. Also in this case, when the relationship between the grid bias voltage and the surface potential, is used, the desired potential level can be provided from the first rotation by correcting the grid bias voltage for the first rotation in the manner described in the foregoing. Therefore, the stabilized image forming operation is possible from the beginning (first rotation).

As described in the foregoing, the latent image forming condition is made different between the latent image formation for the first rotation of the drum after the start and the image formation in the second rotation, by which the first print time is shortened. This is particularly effective when the diameter of the photosensitive drum is large.

Since the potential measurement is carried out without the pre-rotation, the time required for the potential measurement can be reduced.

This invention is particularly effective in the case of an image forming apparatus using an OPC photoconductor or the like or a charging system using a corona charger, for example, which have required the pre-rotation for the potential stabilization.

In the foregoing, the change of the latent image forming condition between the first rotation and the second rotation, is described. If a difference occurs between the second and the third and subsequent rotations, the latent image forming condition is changed between the second and third rotations.

The above-described apparatus is in the form of a monochromatic printer.

Figure 13:
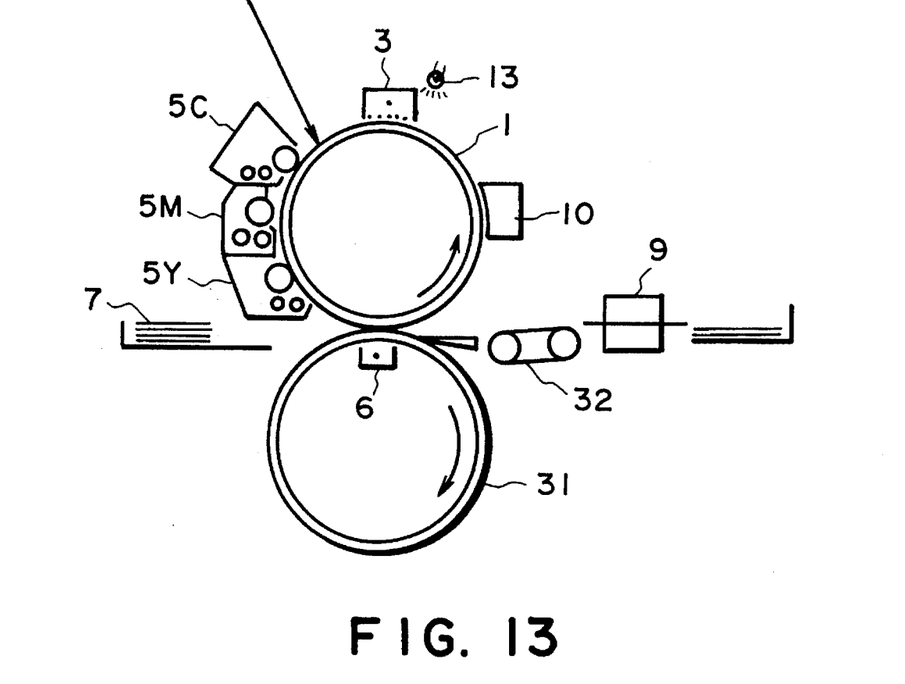
FIG. 13 is an illustration of a color laser beam printer of another embodiment of the present invention.
Figure 14:
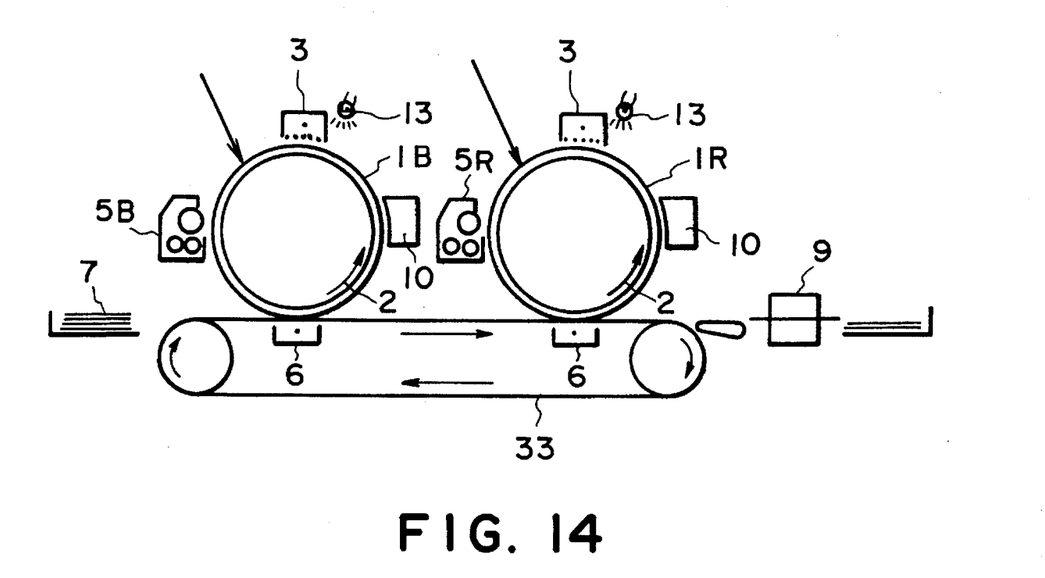
FIG. 14 is an illustration of color laser beam printer of another embodiment of the present invention.

FIGS. 13 and 14 show printers for producing color images. In the apparatus of FIG. 13, around the photosensitive member 1, there are provided a developing device 5C containing cyan toner, a magenta developing device 5M containing magenta toner and an yellow developing device 5Y containing yellow toner. Facing the photosensitive member 1, there is a transfer drum 31, and the transfer material 7 is supported on the drum 31 by a gripper, and is electrostatically attracted thereon. First, a cyan toner image is formed on the photosensitive member, and is transferred onto the transfer material on the drum 31. Next, the magenta and subsequently the yellow toner images are transferred onto the same transfer material, so that a full-color image is formed thereon.

In the above apparatus in which one overlaid image is formed through a plurality of turns of the photosensitive member, the present invention is particularly effective since the color balance can be adjusted for the respective toners in a short period of time.

In the apparatus of FIG. 14, a photosensitive member 1B is used with a developing device 5B containing black toner, and a photosensitive member 1R is used with a developing device 5R containing the red toner. The transfer material 7 is conveyed on a transfer belt 23, so that the black and red toner images are sequentially transferred at the respective transfer positions of the respective photosensitive members. By doing so, an overlaid image is formed on the transfer sheet 7.

In the apparatus of FIG. 13, the plural developing devices are disposed around one photosensitive drum, and therefore the circumference of the photosensitive member is long. Thus, the image formation speed increase effect is particularly advantageous in this apparatus because the preliminary rotation (pre-processing) for the photosensitive member is eliminated. In the apparatus of FIG. 14, a full-color image formation is possible if cyan, yellow and magenta photosensitive members are employed. Also in this case, the reduction of the time is advantageous in such an apparatus both for a single printing operation and continuous printing operation. When a plurality of images are produced in the apparatus of FIG. 14, the change of image quality from the initial state with the time of use can be prevented.

In order to obtain move advantages, the photosensitive member is positively discharged after the completion of the image forming operation. More particularly, after a predetermined number of image forming processes, that is, after completion of continuous image forming operations, for example, the photosensitive member is cleaned by the cleaning means after the last image transfer. In addition, the photosensitive member is rotated through one or more full-turns while exposing the photosensitive member to uniform light from an LED element or a halogen lamp. Thus, the photosensitive member is electrically discharged by the light. The residual charge may be removed from the photosensitive member and the photosensitive member is discharged more efficiently by further applying AC corona discharge to the photosensitive member. The positive use of the discharging step is particularly effective to the electrophotographic photosensitive member in which the residual charge does not attenuate easily.

The use of the additional step is effective to improve the image quality in addition to the reduction of the image formation period.

While the invention has been described with reference to the structures disclosed herein, it is not confined to the details set forth and this application is intended to cover such modifications or changes as may come within the purposes of the improvements or the scope of the following claims.

What is claimed is:

1. An image forming method, comprising the steps of:
   charging an image bearing member by a charger;
   first detecting a surface potential of the charged image bearing member;
   secondly detecting a surface potential of the image bearing member after the first detection; and
   controlling an image forming condition on the basis of the difference between the potentials detected in the first and second detecting steps.

2. A method according to claim 1, wherein the image forming condition controls an amount of charge on the image bearing member provided in the charging step.

3. A method according to claim 1, wherein the controlling step reduces the difference between the potentials.

4. A method according to claim 1, further comprising the steps of effecting a first image forming operation after the first detecting step, and effecting a second image forming operation after the controlling step.

5. A method according to claim 4 wherein the image bearing member has a circumferential length long enough for one image forming operation.

6. A method according to claim 4, further comprising the step of forming an electrostatic image on the image bearing member and developing the image with toner, and transferring the developed image onto a transfer material.

7. A method according to claim 6, further comprising the step of overlaying magenta, cyan and yellow toner images on the transfer material.

8. An image forming apparatus comprising:
   a rotatable photosensitive member;
   a charger for charging said photosensitive member;
   exposure means for exposing said photosensitive member to image light to form an electrostatic image;

developing means for developing the electrostatic image;

potential detecting means for detecting a potential of said photosensitive member charged by said charger;

comparison means for comparing a first potential of said photosensitive member during one rotation thereof and a second potential of said photosensitive member during a next rotation thereof; and setting means, responsive to an output of said comparison means, for setting output levels of said charger during first and second rotations of said photosensitive member upon a start of an image forming operation.

9. An apparatus according to claim 8, wherein said comparison means compares the potentials from actuation of a main switch of said apparatus to a stand-by state of said apparatus.

10. An apparatus according to claim 9, wherein the one rotation corresponds to a first pre-rotation of said photosensitive member after actuation of the main switch.

11. An apparatus according to claim 9, wherein said setting means maintains a constant output level of said charger after a second rotation in the image formation operation.

12. An apparatus according to claim 8, wherein said potential detecting means detects the potentials at a same position on said photosensitive member.

13. An apparatus according to claim 8, wherein said potential detection means obtains an average potential of a plurality of positions on said photosensitive member.

14. An apparatus according to claim 8, wherein said charger has a grid, and said setting means sets a bias level to be applied to said grid.

15. An apparatus according to claim 8, wherein said setting means sets an output level of said charger on the basis of a rest period and based on the output of said comparison means.

16. An apparatus according to claim 8, wherein said setting means sets the output level of said charger to substantially eliminate potential difference between the first rotation and the second rotation of said photosensitive member.

* * * * *

UNITED STATES PATENT AND TRADEMARK OFFICE
CERTIFICATE OF CORRECTION

PATENT NO. : 5,587,778
DATED : December 24, 1996
INVENTOR(S) : Fukushima et al.

It is certified that error appears in the above-indentified patent and that said Letters Patent is hereby corrected as shown below:

COLUMN 1:

Line 28, "i" should read --1--.

COLUMN 3:

Line 5, "mean" should read --means--.
Line 7, "surface." should read --surface--.
Line 9, "formation which is." should read --formation.--.

COLUMN 4:

Line 15, "receive" should read --receives--.
Line 60, "FIG. 4 is" should read --FIG. 4,--.

UNITED STATES PATENT AND TRADEMARK OFFICE
CERTIFICATE OF CORRECTION

PATENT NO. : 5,587,778
DATED : December 24, 1996
INVENTOR(S) : Fukushima et al.

It is certified that error appears in the above-indentified patent and that said Letters Patent is hereby corrected as shown below:

COLUMN 5:

Line 31, "rotations," should read --rotations--.
Line 42, before "between" insert --is--.
Line 55, "VDC." should read --$V_{DC}$.--.

COLUMN 8:

Line 8, "move" should read --more--.

Signed and Sealed this

Fourteenth Day of October, 1997

Attest:

BRUCE LEHMAN

*Attesting Officer*        *Commissioner of Patents and Trademarks*